March 5, 1946.　　　　S. DU PONT　　　　2,396,041
RESILIENT MOUNTING FOR HANDLE BARS
Filed Dec. 21, 1944

INVENTOR
STEPHEN DU PONT
BY
ATTORNEYS

Patented Mar. 5, 1946

2,396,041

UNITED STATES PATENT OFFICE 2,396,041

RESILIENT MOUNTING FOR HANDLE BARS

Stephen du Pont, Wilbraham, Mass., assignor to Indian Motocycle Company, Springfield, Mass., a corporation of Massachusetts Application December 21, 1944, Serial No. 569,214

10 Claims. (Cl. 74—551.2)

This invention relates to an improved handle bar assembly and to the resilient mounting therefor. It is more particularly adapted for use with the steering head of a motorcycle, although it is applicable to any other analogous use.

The principal object of the invention is to provide simplified means for giving a resilient mounted handle bar of a motorcycle a greater degree of freedom in the cushioning of road shocks while maintaining rigid control of the steering movement of the head at all times, so essential to the rider's safety.

Resilient mountings for handle bars as heretofore constructed have provided for only a limited scope of cushioning effect for the various shocks encountered in riding. This is due in part to the one piece integral character of the handle bar usually employed and in part to the method of mounting the same. In my improved construction I divide the handle bar into separate right and left hand branches and mount each branch individually in resilient cushioning means which serve as a universal pivot in permitting a resiliently restrained movement for said branch in the absorption of shocks from all different directions. Furthermore, the separate branches of the handle bar are articulated or joined at inner adjacent ends so as to compel synchronous movement in the same direction for each branch and thus insure the same perfect steering control as with a rigid one-piece handle bar.

Referring to the drawing which shows a preferred improvement of my invention;

Figure 1:
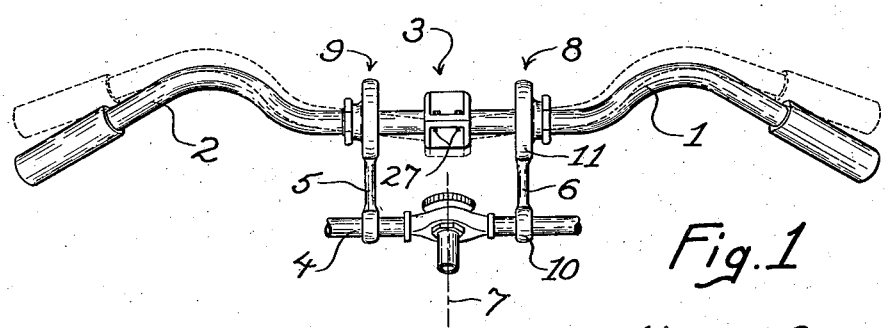
Fig. 1 is a front elevation of the handle bar assembly shown as connected to the steering head bracket of a motorcycle.

Referring more particularly to the drawing, the handle bar as a whole comprises two separate branches, right and left hand respectively designated at 1 and 2. The usual hand grips are located at the outer ends of said branches. At their inner adjacent ends these branches are articulated or joined together by means of a flexible and resilient coupling indicated generally at 3. At an equal distance from the coupling, each branch 1 and 2 is supported in a resilient cushion mount which serves as a universal pivot about which said branch may swing to the extent permitted by said mount. A fork stem bracket of a motorcycle steering head is shown in part at 4, and extension arms 5 and 6 are detachably but rigidly fastened to this bracket in separated positions, one at each side of the center line at 7 for supporting the cushion pivot mounts indicated generally at 8 and 9.

These extension arms and their associated parts are exactly alike (in a right and left hand sense) and only one need be described in detail. One end of the arm 6 comprises a suitable clamp 10 by which it may be rigidly fastened to the bracket 4. The other end of said arm 6 takes the form of a collar band or retainer 11 as shown. The inner face of the retainer collar 11 has preferably molded thereto or securely fastened therein in any suitable way, a ring-like bushing 12 of rubber-like material, having a central opening at 13.

Figure 2:
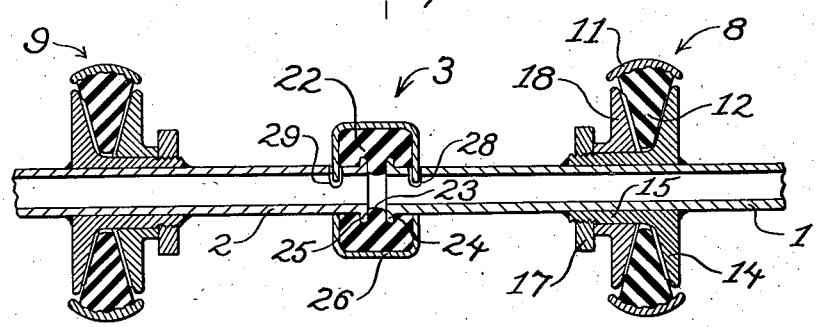
Fig. 2 is an enlarged sectional detail at the inner portions of the handle bar branches showing the central resilient coupling and the resilient pivotal mounting for each branch.

An inner retainer device for the resilient bushing 12 is fixedly mounted on the intermediate portion of the branch 1 of the handle bar and is formed to provide an annular channel preferably V shaped in cross section to receive the bushing, the latter being shaped to correspond therewith as shown in Fig. 2. This inner retainer device comprises a disk member 14 having an integral sleeve 15 for extending through the opening 13 of the bushing. The member 14 is preferably welded to the branch 1 of the handle bar as shown. Cooperating with the disk member 14 is a disk or pressure adjusting member 18 which is slidably mounted on the sleeve 15 of disk member 14. The outer end of said sleeve 15 is screw threaded to receive a nut 17 which bears against the pressure disk 18 for adjusting and clamping the same in pressure relation against the interposed bushing 12. The abutting faces of the disks 14 and 15 are preferably serrated or ribbed as indicated at 19 on the disk 14 in Fig. 3, whereby when clamped together the disk faces will firmly grip into the resilient material of the bushing. Any relative rotation between disk 18 and disk 14 is prevented by a key 20 on disk 18 engaging in a slot 21 on the sleeve 15. As shown the resilient bushing 12 is slightly larger in diameter than the retainer disks 14 and 18 whereby there is provided a gap between the periphery of said disks and the collar band 11 to permit a limited pivotal movement in all directions for branch 1. In a similar manner branch 2 of the handle bar has a pivotal movement on its extension arm 5.

The inner adjacent ends of branches 1 and 2 are joined together by the resilient coupling device 3 which preferably comprises a block of rubber-like material 22 having a recessed inner core 23 to receive the ends of the branches 1 and 2. Flanges 24 and 25 are formed on the inner ends of said branches respectively to lock within the core of said rubber-like block 22. The adjacent ends of said branches 1 and 2 are spaced apart slightly within the block 22 as shown. The block of rubber-like material 22 is retained in position on the ends of said branches 1 and 2 by means of a housing retainer cylinder 26 preferably made in two halves which are fastened together by bolts such as 27. Notches 28 and 29 are preferably formed in the branches 1 and 2 respectively which are adapted to receive depending projections at the rim of the retainer 26 to thereby lock the branches 1 and 2 from relative rotation axially of one another.

Figures 3, 4:
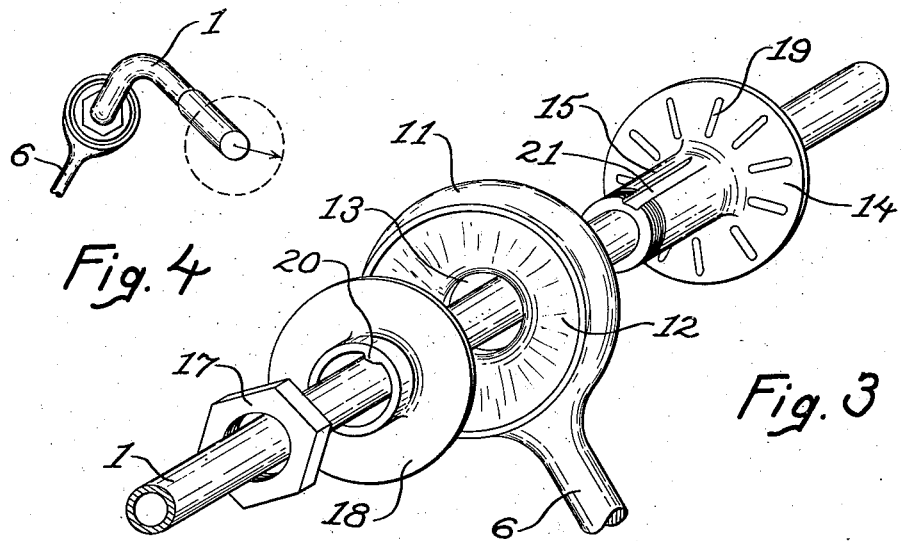
Fig. 3 is a detail view in perspective of a portion of one branch of the handle bar showing the different parts of a resilient pivotal mount in disassembled relation.
Fig. 4 is a side view of the handle bar showing by dotted line diagram the scope of movement thereof in absorbing shocks.

In the operation of my handle bar assembly, it will be appreciated that each of the resilient mountings which include the rubber-like bushings 12 will act as a universal pivot, each for its respective branch of the handle bar. Fig. 1 shows in dotted line one of the positions which the branches of the handle bar may assume in cushioning a road shock. The manner of articulating the inner ends of said handle bar branches by the resilient coupling 3 compels the outer or grip ends of the branch arms to move together synchronously in the same direction and thus maintain proper control of steering. Fig. 4 shows by the dotted line diagram full scope of movement of the handle bar grips. In other words the grip ends of the handle bar branches in meeting road shocks may swing under the restraint of the cushioning members in any direction of the vertical plane throughout 360 degrees of arc, and will thus cushion a much wider variety of road shocks than in construction heretofore employed. Furthermore, while the handle grip and bars have this versatility of movement in the cushioning of shocks they always retain complete control of the steering head of the motorcycle in the same manner as in the case of a single piece handle bar.

I claim:

1. In combination with the steering head of a vehicle, a handle bar assembly, comprising separate right and left hand branch members having their inner ends adjacent one another, means individual to each branch member for securing the same on said steering head, each said means comprising a resilient mounting constructed and arranged to provide for a universal pivotal movement of its respective branch member, and a flexible coupling which joins the inner adjacent ends of said branch members and constrains the outer ends of said branch members to move in the same direction about their respective mountings.

2. In combination with the steering head of a vehicle, a handle bar assembly, comprising separate right and left hand branch members having their inner ends adjacent one another, means individual to each branch member for securing the same on said steering head, each said means comprising a resilient mounting constructed and arranged to provide for a universal pivotal movement of its respective branch member, and a flexible coupling which joins the inner adjacent ends of said branch members in a resilient manner and constrains the outer ends of said branch members to move in the same direction about their respective mountings.

3. In combination with the steering head of a vehicle, a handle bar assembly, comprising separate right and left hand branch members having their inner ends adjacent one another, a resilient mounting individual to each branch member for securing the same on said steering head, each mounting comprising a bushing of rubber-like material clamped between retainers, one of said retainers being carried by said respective branch member, the other retainer being carried by said steering head, and a flexible coupling which joins the inner adjacent ends of said branch members and constrains the outer ends of said branch members to move in the same direction about their respective mountings.

4. In combination with a steering head of a vehicle, a handle bar assembly, comprising separate right and left hand branch members having their inner ends adjacent one another, a resilient mounting individual to each branch member for securing the same on said steering head, each mounting being constructed and arranged to provide for a universal pivotal movement of its respective branch member, and a coupling for the inner adjacent ends of said branch members comprising a block of rubber-like material embracing said adjacent ends and a retainer housing for said block.

5. In combination with the steering head of a vehicle, a handle bar assembly, comprising separate right and left hand branch members having their inner ends adjacent one another, a resilient mounting individual to each branch member for securing the same on said steering head, each mounting being constructed and arranged to provide for a universal pivotal movement of its respective branch member, and a coupling for the inner adjacent ends of said branch members comprising a block of rubber-like material embracing said adjacent ends and a retainer housing for said block having a splined connection to both of said branch members to prevent relative rotative movement of said branch members.

6. In combination with the steering head of a vehicle, a handle bar assembly, comprising separate right and left hand branch members having their inner ends adjacent one another, a resilient mounting individual to each branch member for securing the same on said steering head, each mounting comprising a bushing of rubber-like material clamped between retainers, one of said retainers being carried by a respective branch member, the other retainer being carried by said steering head, and a coupling for the inner adjacent ends of said branch members comprising a block of rubber-like material embracing said adjacent ends and a retainer housing for said block.

7. In combination with the steering head of a vehicle, a handle bar assembly, comprising separate right and left hand branch members having their inner ends adjacent one another, a resilient mounting individual to each branch member for securing the same on said steering head, each mounting comprising a bushing of rubber-like material clamped between retainers, one of said retainers being carried by a respective branch member, the other retainer being carried by said steering head, and a coupling for the inner adjacent ends of said branch members comprising a block of rubber-like material embracing said adjacent ends and a retainer housing for said block having a splined connection to both of said branch members to prevent relative rotative movement of said branch members.

8. In combination with the steering head of a vehicle, a handle bar assembly, comprising separate right and left hand branch members having their inner ends adjacent one another, a resilient mounting individual to each branch member for securing the same on said steering head, each mounting comprising a bushing of rubber-like material clamped between retainers, one of said retainers being carried on a respective branch member and formed with an annular channel to receive said bushing, the other retainer being carried on said steering head and formed as a collar band for the outer side of said bushing, and a flexible coupling which joins the inner adjacent ends of said branch members and constrains the outer ends of said branch members to move in the same direction about their respective mountings.

9. In combination with the steering head of a vehicle, a handle bar assembly, comprising separate right and left hand branch members having their inner ends adjacent one another, a resilient mounting individual to each branch member for securing the same on said steering head, each mounting comprising a bushing of rubber-like material clamped between retainers, one of said retainers being carried on a respective branch member and formed with an annular channel to receive said bushing, the other retainer being carried on said steering head and formed as a collar band for the outer side of said bushing, and a coupling for the inner adjacent ends of said branch members comprising a block of rubber-like material embracing said adjacent ends and a retainer housing for said block.

10. In combination with the steering head of a vehicle, a handle bar assembly, comprising separate right and left hand branch members having their inner ends adjacent one another, a resilient mounting spaced from the inner end of each branch member for securing the same on said steering head, each mounting comprising a bushing of rubber-like material clamped between retainers, one of said retainers being carried on a respective branch member and formed with an annular channel to receive said bushing, the other retainer being carried on said steering head and formed as a collar band for the outer side of said bushing, and a coupling for the inner adjacent ends of said branch members comprising a block of rubber-like material embracing said adjacent ends and a retainer housing for said block having a splined connection to both of said branch members to prevent relative rotative movement of said branch members.

STEPHEN DU PONT.